(12) United States Patent
Bhattacharya et al.

(10) Patent No.: US 9,032,352 B2
(45) Date of Patent: May 12, 2015

(54) METHOD OF OPTIMIZING CAPACITIVE COUPLINGS IN HIGH-CAPACITANCE NETS IN SIMULATION OF POST-LAYOUT CIRCUITS

(71) Applicant: Synopsys, Inc., Mountain View, CA (US)

(72) Inventors: Mayukh Bhattacharya, Palo Alto, CA (US); Michal Jerzy Rewienski, Gdansk (PL); Amelia Huimin Shen, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/910,848

(22) Filed: Jun. 5, 2013

(65) Prior Publication Data
US 2014/0365986 A1 Dec. 11, 2014

(51) Int. Cl.
*G06F 17/50* (2006.01)
*G06F 9/455* (2006.01)

(52) U.S. Cl.
CPC .................................. *G06F 17/5081* (2013.01)

(58) Field of Classification Search
USPC .......... 716/113, 115; 702/61, 64, 65, 69, 169, 702/191; 324/627, 628, 677, 609, 612, 617
See application file for complete search history.

(56) References Cited

U.S. PATENT DOCUMENTS

| | | | |
|---|---|---|---|
| 6,327,542 B1 * | 12/2001 | McBride | 702/64 |
| 6,791,343 B2 * | 9/2004 | Ramarao et al. | 324/677 |
| 7,562,323 B1 * | 7/2009 | Bai et al. | 716/115 |
| 7,594,209 B2 * | 9/2009 | Abbaspour et al. | 716/108 |
| 2006/0080627 A1 * | 4/2006 | Murgai et al. | 716/6 |
| 2007/0220459 A1 * | 9/2007 | Gurney | 716/5 |
| 2011/0069782 A1 * | 3/2011 | Wilson et al. | 375/295 |
| 2013/0033915 A1 * | 2/2013 | Lam et al. | 365/49.1 |
| 2014/0068539 A1 * | 3/2014 | Jung et al. | 716/115 |

\* cited by examiner

*Primary Examiner* — Brian Ngo
(74) *Attorney, Agent, or Firm* — Bever, Hoffman & Harms, LLP

(57) ABSTRACT

A method of asymmetric asynchronous decoupling of capacitors in an integrated circuit design is provided for faster simulation by circuit simulators, e.g. FastSPICE circuit simulators. This method includes removing a coupling capacitor from a list, which includes coupling capacitors that capacitively couple two nets in the design. The two nets have capacitances C1 and C2, and at least one of capacitances C1 and C2 exceeds a threshold. The coupling capacitor has capacitance Cc. When coupling capacitance Cc is low and only one of capacitances C1 and C2 has a low capacitance, then a forward capacitance can be used at whichever of the two nets has the low capacitance and a lump capacitance can be used at the other net for simulation. When coupling capacitance Cc is low and both of capacitances C1 and C2 have high capacitances, then lump capacitances can be used at the two nets for the simulation.

24 Claims, 7 Drawing Sheets

300

| | C1 | Cc | C2 | Optimization |
|---|---|---|---|---|
| 301 | L | L | L | Default algorithm |
| 302 | L | L | H | Lump-Lump or Forward-Lump |
| 303 | L | H | L | Impossible |
| 304 | L | H | H | Impossible |
| 305 | H | L | L | Lump-Lump or Lump-Forward |
| 306 | H | L | H | Lump-Lump |
| 307 | H | H | L | Impossible |
| 308 | H | H | H | Do not decouple |

METHOD OF OPTIMIZING CAPACITIVE COUPLINGS IN HIGH-CAPACITANCE NETS IN SIMULATION OF POST-LAYOUT CIRCUITS

BACKGROUND OF THE ART

Related Art

Advancing semiconductor manufacturing technology allows one to design integrated circuits of unprecedented complexity using ever shrinking transistors with non-planar technology. However, after placing and routing of such advanced designs, an enormous number of parasitic capacitive couplings appear. These parasitic capacitive coupling can significantly degrade performance in the implemented circuit. For example, when capacitive coupling occurs between adjacent wires, it may cause noise in one or both signals on those adjacent wires. Moreover, in sparse areas of the design, non-functional elements called "fills" or "dummies" are placed to ensure uniform layer thicknesses during CMP. However, these fills result in a large capacitive network that may adversely affect adjacent functional elements. Therefore, accurate modeling of capacitive couplings in a design is highly desirable.

Unfortunately, having a large number of capacitive couplings (modeled by linear capacitors) in post-layout integrated circuit designs currently poses a major problem in simulation. Specifically, in FastSPICE simulation, large designs may be simulated only if the simulator is able to effectively partition the design into smaller design areas, thereby simplifying the computational problem. Capacitive couplings severely complicate such partitioning. Indeed, simulators dealing with designs having a large number of capacitive couplings typically disable circuit (or matrix) partitioning, thereby rendering simulation extremely inefficient or altogether impossible. Furthermore, the problem of capacitive couplings becomes critical at the newest and upcoming technology nodes (notably, those based on finFET technology) which see an explosion in the number of back-annotated capacitors.

Existing simulator solutions to this capacitive coupling problem often prove ineffective or inadequate. For example, one simple capacitor decoupling technique relies on splitting a coupling capacitor having a capacitance value below a low threshold into pairs of grounded capacitors (called lump capacitors). FIG. 1A illustrates a simple layout configuration including two wires 101 and 102, which because of their lengths, are represented (modeled) by a number of nodes and wire segments by an electronic design automation (EDA) tool. Each of the wire segments between nodes has a capacitance and a resistance (modeled e.g. by a resistor and a capacitor). A simulator receives these nodes, resistors and capacitors. In order to find effective capacitance of a wire (modeled by the connected resistors) the simulator would typically add together all capacitors connected to this wire. For example, wire 101 (comprising a first set of nodes, capacitances, and resistances) is characterized as having a capacitance C1, whereas wire 102 (comprising a second set of nodes, capacitances, and resistances) is characterized as having a capacitance C2. Notably, because of the proximity of wires 101 and 102, a coupling capacitance Cc between wires 101 and 102 is also provided by the EDA tool. An exemplary EDA tool is the RCXT™ tool licensed by Synopsys, Inc.

In accordance with the above decoupling technique and referring to FIG. 1B, capacitances C1 and C2 can be decoupled (i.e. capacitively decoupled) during simulation with each wire having a "lump" capacitance value, which includes the effective net wire capacitance as well as the coupling capacitance. This decoupling enables partitioning, yet may adversely affect simulation accuracy (based on capacitive conditions, as described in further detail below), thereby yielding unacceptable results. On the other hand, traditional model order reduction techniques, which often provide accuracy control, are unable to effectively decouple the sub-circuits (due to the local nature of this optimization), thereby yielding inadequate simulation performance. Finally, iterative solvers which could work with very large partitions cannot be applied for general purpose, due to their inadequate robustness and lack of reliability.

SUMMARY

A method of providing asymmetric asynchronous decoupling of nets in an integrated circuit design is provided. This method includes removing a coupling capacitor from an input list. The input list includes coupling capacitors that capacitively couple two nets in the design. The two nets have capacitances C1 and C2, and at least one of the capacitances C1 and C2 is high. The coupling capacitor has a coupling capacitance Cc. When the coupling capacitance Cc is low and only one of the capacitances C1 and C2 is low, then a forward capacitance can be used at whichever of the two nets has the low capacitance and a lump capacitance can be used at the other net for simulation. When the coupling capacitance Cc is low and both of the capacitances C1 and C2 are high capacitances, then lump capacitances can be used at the two nets for the simulation.

In one embodiment, a capacitance is characterized as high when it exceeds a threshold, whereas another capacitance is characterized as low when it does not exceed the threshold. In another embodiment, a capacitance is characterized as high or low by comparing it to a threshold derived from the actual net capacitances in the design. In yet another embodiment, one of a predetermined threshold or a derived threshold and at least one other criterion determine whether a capacitance is characterized as high/low.

The method can further include determining whether the capacitances C1 and C2 are within a predetermined range of each other. When the capacitances C1 and C2 are within the predetermined range of each other, then the method can proceed with using the forward capacitance. When the capacitances C1 and C2 are not within the predetermined range of each other, then lump capacitances can be used at the two nets for the simulation. In another embodiment, when the capacitance Cc is greater than 10% of the capacitance C1 or C2, whichever is smaller, then proceeding with using the forward capacitance.

The method can further include repeating the steps of removing and using forward and/or lump capacitances until the input list is empty. The method can further include creating the input list, which excludes certain capacitors, e.g. any coupling capacitors forming a device that must retain its capacitive couplings to provide a desired functionality. The method can further include creating an output list, which includes transformed (optimized) capacitors. Transformed capacitors may include forward capacitors and lump capacitors. If model order reduction is also applied, then the output list also may include reduced order models for RC networks, which were created from the transformed capacitors and resistors of the design.

This method allows decoupling of large post-layout nets from the rest of the circuit with accuracy control in contrast to standard decoupling methods, which are either ineffective or do not provide adequate accuracy. This method can be used in conjunction with other decoupling methodologies. This method can be combined with parasitic reduction methods, including model order reduction techniques without impairing the simulator's ability to perform partitioned, asynchronous solves.

A non-transitory, computer-readable medium storing computer-executable instructions for providing asymmetric asynchronous decoupling of nets in a design for an integrated circuit is also provided. These instructions when executed by a computer cause the computer to execute a process described herein. An electronic design automation (EDA) tool including program instructions for providing asymmetric asynchronous decoupling of nets in a design for an integrated circuit is also described. These program instructions perform a process described herein.

DETAILED DESCRIPTION OF THE DRAWINGS

A method for globally optimizing predetermined capacitive couplings is described. This method advantageously complements existing capacitor optimization methods, while resolving some of their major weaknesses. Specifically, the capacitive coupling optimization method enables effective circuit partitioning, yet retains the ability to simulate important coupling effects. This technique is called a directional capacitive decoupling technique herein.

Figure 2:
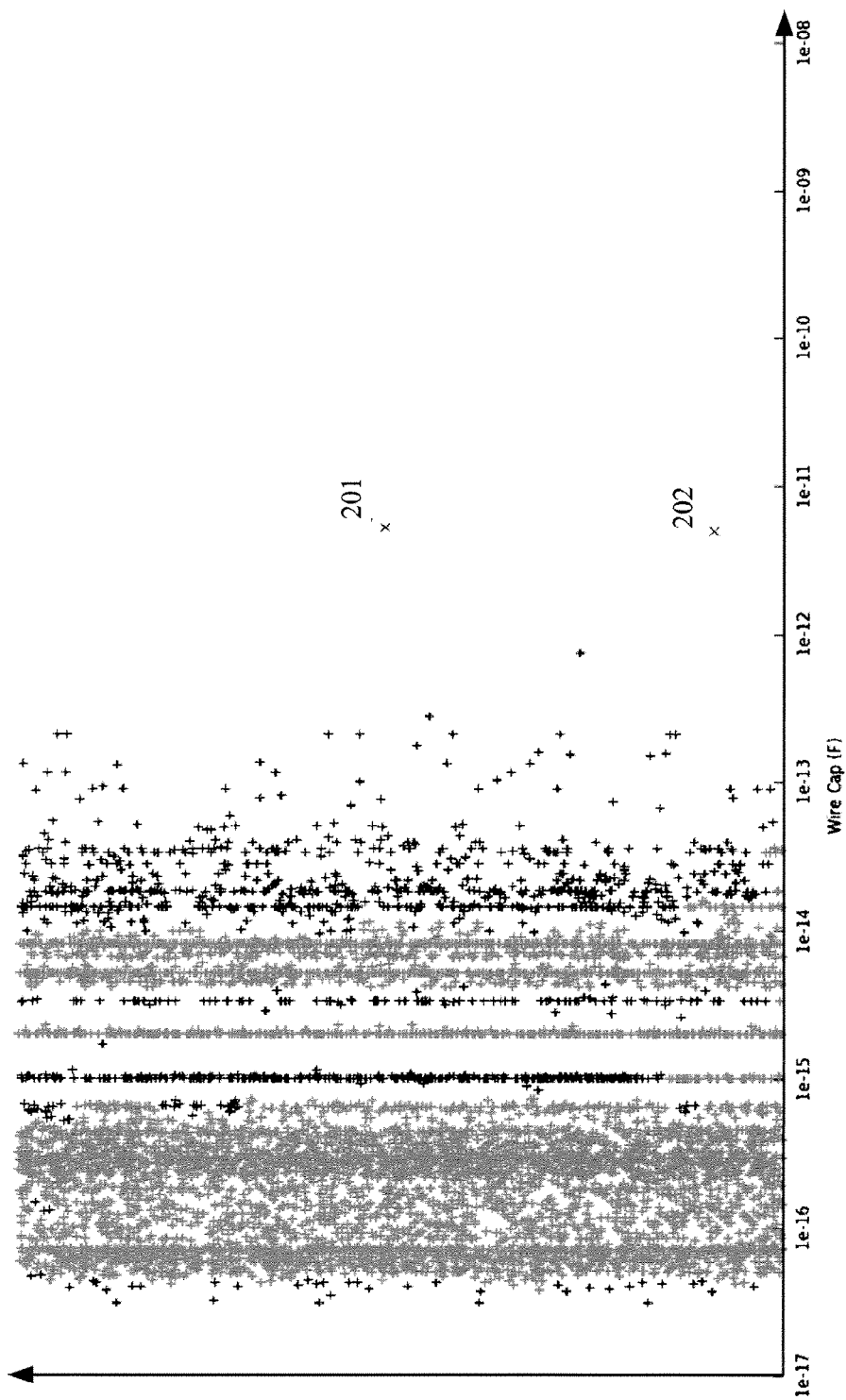
FIG. 2 illustrates the wire capacitance distribution for the nets from an exemplary state-of-the-art integrated circuit design.

In accordance with one feature of the directional capacitive decoupling technique, a net with a high capacitance can be partially decoupled from an adjacent net having a low capacitance during simulation. For example, FIG. 2 illustrates the wire capacitance distribution of the nets from an exemplary state-of-the-art integrated circuit design. Note that the vertical axis is a random distribution of nets (each net being a "+"), thereby clearly showing the density of certain wire capacitances in a design. In this design, fills may have a very low capacitance of 1e-16 F to 1e-15 Farad (F), whereas nets with transistors may have a low capacitance of 1e-15 F. In one embodiment, the directional capacitive decoupling technique can be applied to the limited number of very high capacitance nets of the design (e.g. less than 1% of the total number of nets in the design). In FIG. 2, these very high capacitance nets, e.g. nets 201 and 202, may have a capacitance higher than 1e-12 F (an exemplary predetermined threshold). Note that these very high capacitance nets are typically those providing power supply voltages to many circuits of the design. In other embodiments for other designs and/or other technology nodes, the high capacitance nets may have a capacitance higher or lower than that shown in FIG. 2.

Figure 3:
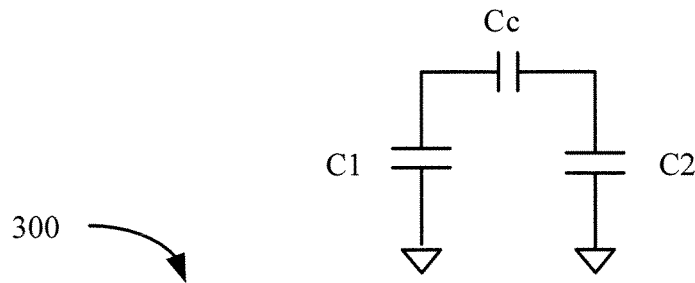
FIG. 3 illustrates a table indicating various conditions for wire (net) capacitances usable in an asymmetric asynchronous decoupling technique.

FIG. 3 illustrates a table 300 indicating various conditions for generic capacitances C1, C2, and Cc (shown for reference in FIG. 3). Note that C1 and C2 are net capacitances (i.e. capacitances for entire nets), whereas Cc is a single capacitor (i.e. one particular capacitive coupling between two different nets). Thus, determining whether a net capacitance C1 or C2 is "high" or "low" may be based on one threshold, and determining whether the capacitance of Cc is "high" or "low" may be based on another threshold. In one embodiment, net capacitance C1 or C2 may be considered high if it is greater than a first predetermined threshold. In another embodiment, net capacitance C1 or C2 may be considered high if it is greater than a derived threshold. An exemplary derived threshold could be the lowest net capacitance of the largest N % (wherein N is any positive number) of all net capacitances in the circuit. In FIG. 2, if N=1, then the derived threshold would be 1e-12.

In one embodiment, capacitance Cc may be considered high if it is greater than a second predetermined threshold. In another embodiment, capacitance Cc may be considered high if it is greater than another derived threshold. An exemplary threshold for Cc could be a certain percentage of the smaller of capacitances C1 and C2 (e.g. 20% of the smaller of net capacitances C1 and C2), or a certain percentage of the high net capacitance threshold (e.g. 10% of the high net capacitance threshold 1e-12).

In yet another embodiment, one of a predetermined threshold or a derived threshold and at least one other criterion determine whether a capacitance is characterized as high/low. For example, a net capacitance may be considered high if it is greater than a threshold, which may be specified as the maximum (or a minimum) of a fixed number (e.g. 1e-12) and a smallest of the top 1% of all net capacitances in the circuit. Note that other percentage values and criteria may be used in various embodiments.

By definition, when a capacitance (net or parasitic) is not "high", it is "low". Note that certain impossible conditions are listed in table 300 for completeness. For example, for capacitive conditions 303, 304, and 307, it is impossible for coupling capacitance Cc to be high (H) when one or both of capacitances C1 and C2 are low (L), because the value of Cc is included in C1 and C2.

Figure 1A:
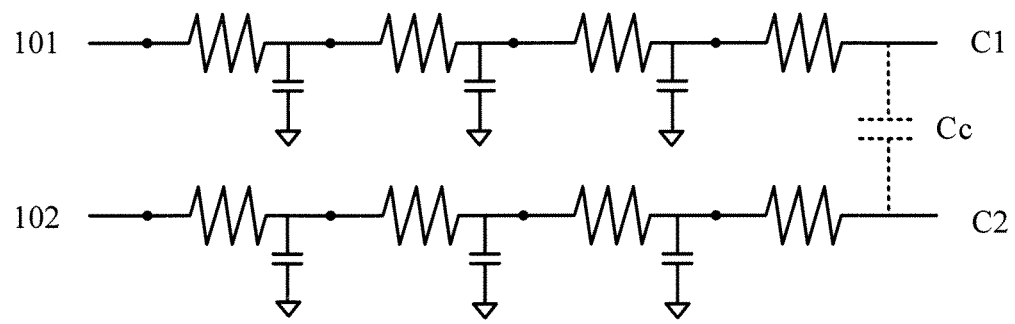
FIGS. 1A and 1B illustrate a standard technique (lump-lump) for decoupling capacitively-coupled nets in an integrated circuit design.
Figure 1B:
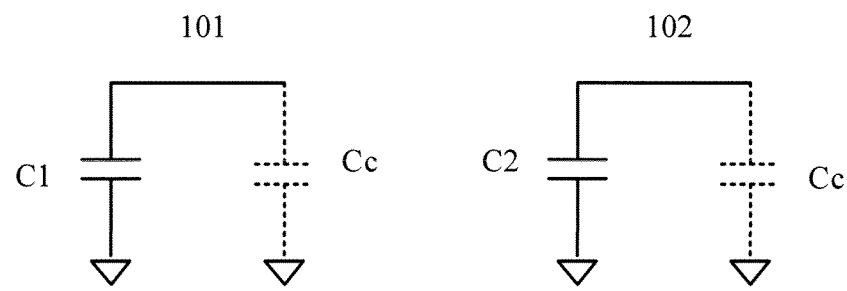

For capacitive condition 301, when capacitances C1 and C2 as well as coupling capacitance Cc are low (L), then a standard default algorithm can be used for decoupling. For example, one standard default algorithm may include ignoring those low capacitances during simulation, thereby allowing automatic decoupling. Further note for capacitive condition 308 when capacitances C1 and C2 as well as coupling capacitance Cc are high (e.g. above the predetermined threshold), then capacitances C1 and C2 should not be decoupled. For capacitive condition 306 when capacitances C1 and C2 are high, but coupling capacitance Cc is low, then capacitances C1 and C2 can be decoupled using the standard capacitance lump technique (described in reference to FIGS. 1A and 1B) without significant loss of accuracy (the resulting optimization called "lump-lump" in FIG. 3). Note that condition 306 may be present when the nets associated with capacitances C1 and C2 are sufficiently separated by a sufficient physical distance that although both nets are high capacitance, the coupling capacitance is still low.

However, there are two capacitive conditions, i.e. conditions 302 and 305, where although lump-lump capacitive decoupling can be used (as shown in FIG. 3), the results may not be accurate, e.g. off by at least 10%. For conditions 302 and 305, one of the wire capacitances is high while the other is low (in both cases, the capacitive coupling is low).

In FastSPICE simulation, there is typically a significant tradeoff of speed and accuracy (i.e. for high accuracy, simulation speed is relatively slow; for high simulation speed, result is less accurate). Notably, using the directional capacitive decoupling technique described herein can ensure good accuracy while providing very good to excellent simulation speed. That being said, when simulation speed is paramount, then a lump decoupling technique may still be preferable over that of the directional capacitive decoupling technique.

In one embodiment, when one of conditions 302 and 305 exists, then the decision to choose between the lump decoupling technique and the directional capacitive decoupling technique may be based on the relative capacitive values of the two wires (i.e. C1 and C2). Specifically, when capacitances C1 and C2 are relatively close (e.g. only a few orders of magnitude apart), then the directional capacitive decoupling technique can be used. However, when capacitances C1 and C2 are relatively far apart (e.g. more than a few orders of magnitude apart), then the lump decoupling technique can be used. In another embodiment, a derivative determination can be used. For example, if capacitance Cc is greater than 10% of the net capacitances C1 or C2, whichever is smaller, then the directional capacitive decoupling technique can be used instead of the lump-lump technique.

In the directional capacitive decoupling technique, an asymmetric asynchronous coupling can be provided. Specifically, a "lump" capacitor is added to a high capacitance net (a first terminal connected to the high capacitance net and a second terminal connected to ground), whereas a "forward" capacitor is added to a low capacitance net (a first terminal connected to the low capacitance net and a second terminal connected to an adjacent high capacitance net). The resulting "lump-forward" or "forward-lump" capacitive configurations ("forward-lump" capacitances used hereinafter to describe either configuration) are effectively a one-directional decoupling of the two nets. Specifically, from the perspective of the high capacitance net, the two nets having the coupling capacitance there between can be decoupled because change in the voltage of the low capacitance net (e.g. a local net) will not significantly change the voltage of the high capacitance net (e.g. a global net would respond very slowly, if at all, to any voltage change on a capacitively coupled, but local net). However, from the perspective of the low capacitance net, the two nets having the coupling capacitance there between should not be decoupled because change in the voltage of the adjacent, high capacitance net could quickly change the voltage of the low capacitance net. In other words, when a capacitor coupling a high capacitance net to a low capacitance net is replaced by a forward capacitor added to the low capacitance net and a lumped capacitor added to the high-capacitive net, a voltage change at the high capacitance net will cause a significant current in the forward capacitor (proportional to dv/dt), whereas a voltage change at the low capacitance net will not cause any current in the lumped capacitor. Therefore, directional capacitive decoupling can accurately model electrical behavior while allowing partitioning.

Figure 4A:
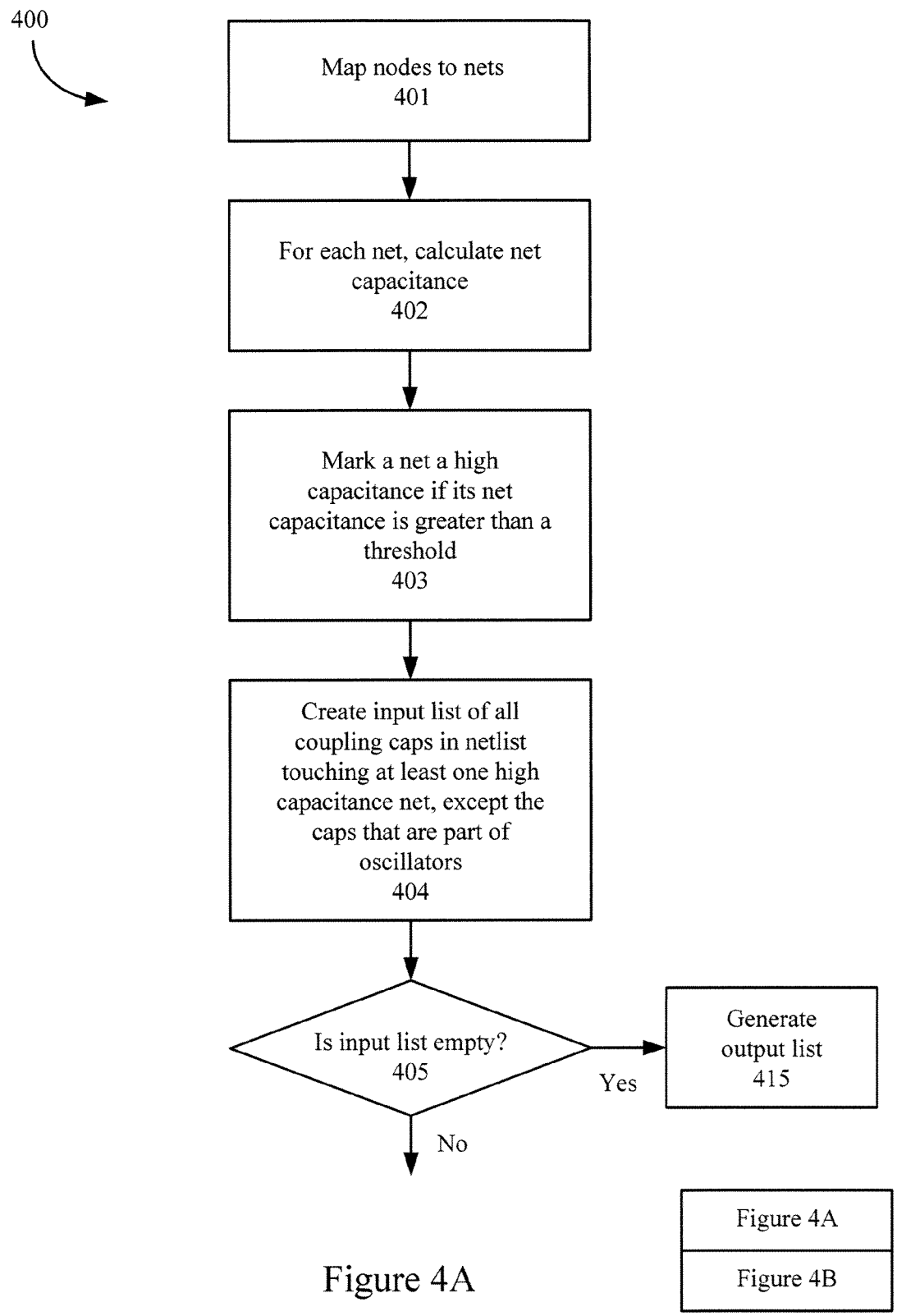
FIGS. 4A and 4B illustrate an exemplary asymmetric asynchronous decoupling technique for capacitively-coupled nets.
Figure 4B:
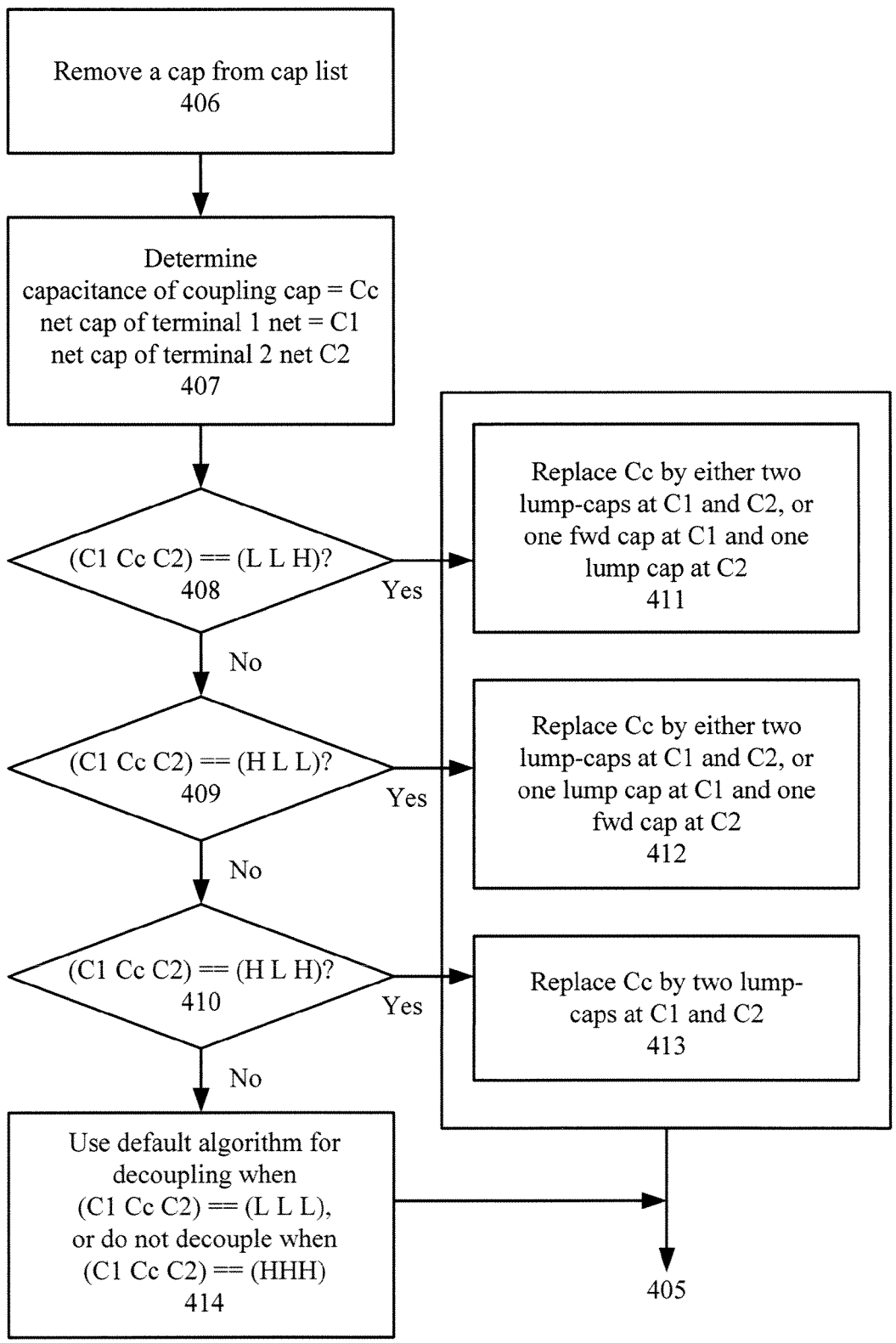

FIGS. 4A and 4B illustrate an exemplary asymmetric asynchronous capacitive decoupling technique 400. In step 401, the nodes of an IC design are mapped to their nets. Note that a netlist of the design will include all the nodes, resistors, and capacitors as well as other elements of the design. From the netlist, nodes (excluding ground nodes) connected to each other through one or more resistors can be easily identified. Such nodes will be mapped to (i.e. assigned to) a single net. In other words, a net is a collection of nodes that are resistively connected to each other.

For each net of the design, its net capacitance is calculated in step 402. In step 403, a net is marked (e.g. flagged) as a high capacitance when it net capacitance is greater than a predetermined threshold. In one embodiment, this predetermined threshold is set to a capacitance of approximately 1e-12 F. In step 404, an input list of coupling capacitors in the netlist of the design touching at least one high capacitance net is created. This input list excludes certain capacitors, e.g. those belonging to oscillators, switched-capacitor circuits (e.g. filters, digital to analog converters, etc.), or charge-pump circuits, all of which must retain their capacitive couplings to provide the desired functionality.

In step 405, a determination is made whether this input list is empty. If not, then a coupling capacitor is removed from the list of capacitors in step 406. In step 407, the values of that coupling capacitor (Cc) and the capacitances of the nets (C1 and C2) connected to the terminals of the coupling capacitor are determined. If the values of those capacitances meet the conditions (C1 Cc C2)==(L L H), as determined in step 408, then the coupling capacitor is replaced either by two lump capacitances at C1 and C2 or by one forward capacitance at C1 and one lump capacitance at C2 in step 411. If the values of those capacitances instead meet the conditions (C1 Cc C2)==(H L L), as determined in step 409, then the coupling capacitor is replaced either by two lump capacitances at C1 and C2 or by one lump capacitance at C1 and one forward capacitance at C2 in step 412. If the values of those capacitances instead meet the conditions (C1 Cc C2)==(H L H), as determined in step 410, then the coupling capacitance is replaced by two lump capacitances at C1 and C2. In step 414, if the conditions of steps 408, 409, and 410 are not present, then either all capacitances are low, in which case any default algorithm can be used, or all capacitance are high, in which case the nets are not decoupled.

Note that the use of two lump capacitances in steps 411 and 412 may be optional in some embodiments, i.e. the forward-lump capacitances may be used irrespective of the capacitance range/ratio for conditions 302 and 305 (FIG. 3). In other embodiments, forward-lump capacitances may be exclusively used (i.e. never using lump-lump capacitances) when replacing the initial coupling capacitor Cc for conditions 302 and 305. As noted above, the tradeoff is between number of inputs to a partition (and hence speed) and accuracy. If more accuracy is desired, then the forward-lump capacitances would be preferred over the lump-lump capacitances. In the former case, the forward capacitance would result in an extra input to its partition and hence can cause that partition to be evaluated more frequently than if it was lump capacitance. But, using the forward-lump capacitances would also be more accurate than the lump-lump capacitances. In one embodiment, the forward-lump capacitances are used as a default, unless a predetermined capacitance range/ratio/derivation for C1 and C2 exists. That is, the default technique of directional capacitive decoupling may be negated based on the results of the above-described capacitance range/difference/ratio/derivation computations. As a result of these computations, in some embodiments, the default step may be replaced by lump decoupling.

After steps 411, 412, 413, or 414, technique 400 returns to step 405 to determine whether the input list of coupling capacitances is empty. When the input list of coupling capacitors is empty, then an output list including transformed (optimized) capacitors can be generated in step 415. Transformed capacitors may include coupling capacitors, forward capacitors, and lump capacitors. If model order reduction is also applied (described below), then the output list may also include reduced order models for RC networks, which were created from the transformed capacitors and resistors of the design.

The asymmetric asynchronous coupling, which provides a lump-forward or forward-lump capacitive configuration, is now described in detail. In general, for a capacitor connected between two nodes A and B, a current I through the capacitor can be calculated as follows:

$$I = C \cdot \frac{d(v_A - v_B)}{dt}$$

where C is the capacitance and dv/dt is the derivative of voltage v with respect to time t (wherein if the voltage v is increasing over time, then the current I is positive, and if the voltage v is decreasing over time, then the current I is negative). In a simulator, a matrix can be used to computationally determine the contribution of individual devices, wherein the size of the matrix corresponds to the number of devices. Every device has a "stamp", which is a 2×2 matrix. Therefore, the above equation rewritten with matrix stamps (assuming a symmetric capacitive coupling model) is:

$$\begin{bmatrix} I_A \\ I_B \end{bmatrix} = \begin{bmatrix} C & -C \\ -C & C \end{bmatrix} \begin{bmatrix} \frac{dv_A}{dt} \\ \frac{dv_B}{dt} \end{bmatrix}$$

Notably, a capacitance matrix stamp for an asymmetric asynchronous capacitive coupling model is of the form:

$$\begin{array}{c} \phantom{n1} \; n1 \;\; n2 \\ n1 \\ n2 \end{array} \begin{bmatrix} c & -c \\ 0 & c \end{bmatrix}$$

where c is the coupling capacitance connecting two nets n1 and n2 (shown as labels for rows and columns above), n1 is a low capacitive net, and n2 is a high capacitance net (note that the capacitance matrix stamp of a typical simulator may also include the $1/\Delta t$ for each entry, but is omitted herein for simplicity). This asynchronous capacitive model allows net n2 to be in a different partition than net n1 for purposes of simulating the behavior of net n2; however, this model also advantageously allows net n2 to be an input to the partition including net n1.

The above-described method then creates an output list including transformed (optimized) capacitors. Those transformed capacitors include coupling capacitors, forward capacitors, and lump capacitors. If model order reduction is also subsequently applied, then the output list also may include reduced order models for RC networks, which were created from coupling, forward, and lump capacitors (previously transformed by the method), and resistors.

A standard EDA process for compressing matrices includes the model order reduction (MOR) of parasitic instances. For example, by using MOR, an original 10×10 matrix may be significantly reduced in size, e.g. to a 5×5 matrix, thereby minimizing computational resources. Unfortunately, standard matrix-based MOR methods work only with symmetric couplings. Therefore, the matrix-based MOR method can be modified to work with the above-described asymmetric capacitive coupling model as described in detail below. To better understand these modifications, an explanation of MOR with symmetric asynchronous couplings is provided below.

Suppose there are two RC networks, net1 and net2, only coupled through a parasitic capacitor $c_c$, which is connected between nodes i and k (where node i is in net1, and node j is in net2). If $c_1$ is the capacitance matrix for net1, and $c_2$ is the capacitance matrix for net2, then the global capacitance $C_g$ matrix for the two coupled nets has the following form:

$$C_g = \begin{bmatrix} \begin{array}{ccc} c_1 & & \\ c_{11} & \cdots & c_{1k} \\ \vdots & c_{ii}+c_c & \vdots \\ c_{k1} & \cdots & c_{kk} \end{array} & \begin{array}{ccc} & c_c & \\ 0 & 0 & 0 \\ 0 & -c_c & 0 \\ 0 & 0 & 0 \end{array} \\ \begin{array}{ccc} 0 & 0 & 0 \\ 0 & -c_c & 0 \\ 0 & 0 & 0 \end{array} & \begin{array}{ccc} c_{k+1,k+1} & \cdots & c_{k+1,n} \\ \vdots & c_{jj}+c_c & \vdots \\ c_{n,k+1} & \cdots & c_{nn} \end{array} \\ \hline c_c^T & c_2 \end{bmatrix}$$

If the parasitic capacitance $c_c$ is small enough (as compared to capacitances for net1 and net2), then simulation of transient voltage and current signals can be performed asynchronously for net1 and net2. This simulation can be done by representing the parasitic cap $c_c$ (whose matrix stamp is $$\begin{bmatrix} c_c & -c_c \\ -c_c & c_c \end{bmatrix})$$

as a symmetric pair of asynchronous forward capacitors (or, in other words, by fast-stamping capacitor $c_c$):

$$\begin{bmatrix} c_c & -c_c \\ -c_c & c_c \end{bmatrix} = \begin{bmatrix} c_c & -c_c \\ 0 & 0 \end{bmatrix} + \begin{bmatrix} 0 & 0 \\ -c_c & c_c \end{bmatrix}$$

For each of the two forward capacitors, the off-diagonal matrix component ($-c_c$) is treated as an external (asynchronous) input term, i.e. net1 has external input from net2 (through parasitic capacitor $c_c$), and net2 has external input from net1 (through parasitic capacitor $c_c$). Consequently, the global capacitance matrix can be partitioned in two sections with the corresponding matrices $c_1$ and $c_2$. This in turn allows separate factorization and linear solves to be done separately for matrices $c_1$ and $c_2$, which yields significant performance gains and memory savings during time-domain transient simulation. Indeed, the ability to partition the global capacitance matrix is one of the key technologies enabling large-scale transistor-level simulations.

To achieve further simulation speedups, MOR techniques can be applied to RC networks. Application of MOR to a global capacitance matrix $C_g$ yields a reduced capacitance matrix $C_r$, which has smaller size and therefore potentially reduces the amount of computation required to perform simulation for a given RC network. However, if standard projection-based MOR is applied to the global capacitance matrix, then the resulting reduced (compressed) model for the RC network (e.g. for net1 and net2 together) cannot be partitioned. This inability to partition can be explained as follows, if V is the projection matrix, then the reduced order matrix $C_r=V^T*C_g*V$ (where $V^T$ is the transpose of V) becomes a dense matrix, and consequently the states (or components) corresponding to net1 and net2 become inherently entangled, and cannot be separated. This dense matrix in turn effectively disables a partitioned, asynchronous solve, thereby rendering standard MOR unsuitable for large-scale transient simulation.

Figure 5:
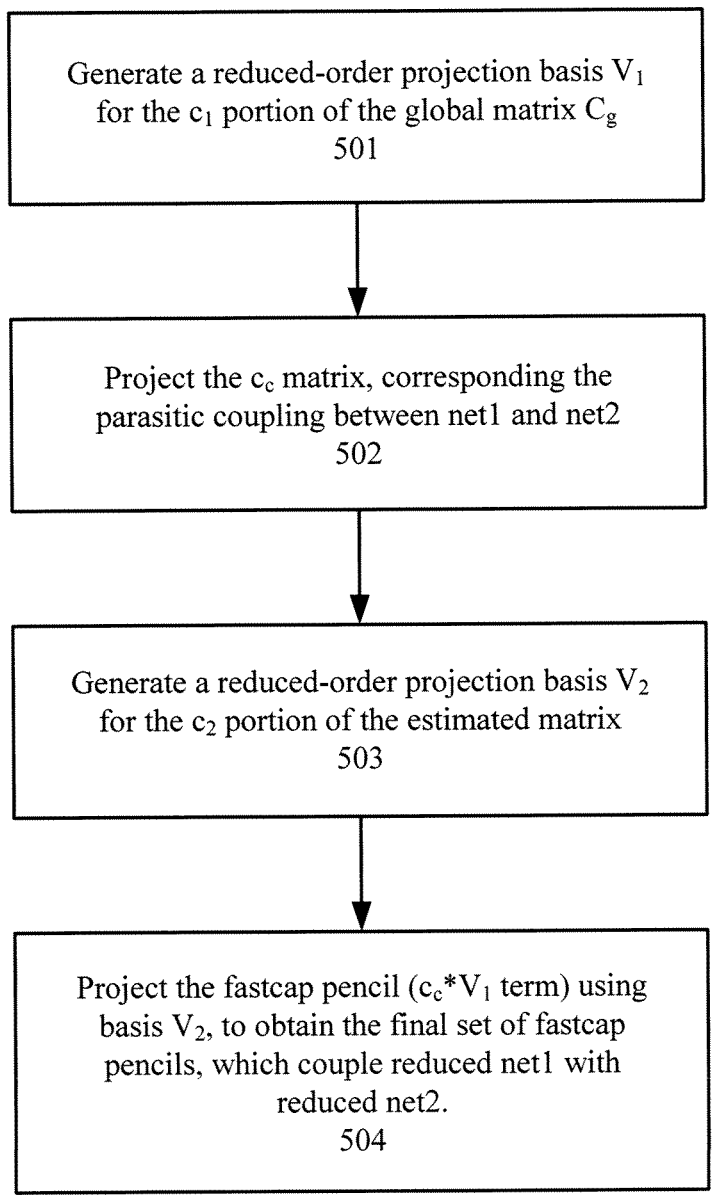
FIG. 5 illustrates an exemplary modified model order reduction technique that can be used in conjunction with the asymmetric asynchronous decoupling technique of FIGS. 4A and 4B.

To retain the ability to perform asynchronous partitioned solves for designs with parasitic coupling capacitors, MOR can be modified. FIG. 5 illustrates an exemplary technique 500 for modifying MOR to accommodate asynchronous partitioning for design with parasitic coupling capacitors. In technique 500, assume that two capacitively-coupled nets net1 and net2 are included in the design. In step 501, a reduced-order projection matrix $V_1$ for the $c_1$ portion of the global matrix $C_g$ can be generated (see use of $V_1^T$ and $V_1$ in upper left quadrant in estimated matrix below).

For context, the concepts of projection and a projection matrix are described in further detail.

Voltages for all nodes in a circuit (at a given time) form a state (more specifically, a vector of states) for the circuit. A state vector can be considered a "snapshot" of all voltages in a circuit. A space of states (or a state-space) is a collection of all possible state vectors for the circuit.

The projection of the state-space is a mathematical transformation of one space of states into another space of states. In model order reduction, a projection is done to transform the initial state-space for a circuit to a state-space which is smaller. Notably, although the state vectors in that space have smaller size, this smaller state-space can still accurately describe a given circuit.

For example, imagine two nodes connected through a very small resistor. Those two nodes (n10 and n20) can be connected to the rest of the circuit through much larger resistors or through other elements (e.g. transistors). Because the two nodes are connected through a very small resistor, their voltages (e.g. v10 and v20, respectively) are almost the same for all times. Hence, those two states ($v_{10}$ and $v_{20}$) can be effectively and accurately represented by just one state, e.g. $v_{new}$. This new circuit representation can be achieved through the discussed projection. (The two states ($v_{10}$,$v_{20}$) are projected onto one state, $v_{new}$.) The projection is mathematically represented by a projection matrix. For this example, the projection matrix $V_{10}$ may take the following form:

$$V_{10} = \begin{bmatrix} 1 \\ 1 \end{bmatrix}$$

and the "old" states are related to the "new" state via the following transformation which involves the projection matrix $V_{10}$:

$$\begin{bmatrix} v_{10} \\ v_{20} \end{bmatrix} = V_{10} \cdot v_{new} = \begin{bmatrix} 1 \\ 1 \end{bmatrix} \cdot v_{new}$$

Using this projection, the number of states in the circuit is reduced, which can lower the simulation cost. The capacitance and conductance matrices, which describe the circuit, are also reduced using the projection matrix. For example, for the C matrix, the transformation is $C_{reduced}=V_{10}^T CV_{10}$. In this example, the initial C matrix was 2×2 (two rows and two columns), whereas $C_{reduced}$ is a 1×1 matrix. The order (or size) of the C matrix was therefore reduced through projection.

There are many methods for automatically generating suitable projection matrices. The most notable algorithms include moment-matching Krylov subspace projection or Truncated Balanced Realization (TBR).

Note that if $V_{10}$ is the 2×1 projection matrix as above, then:

$$V_{10}^T = [1\ 1]$$

which is a 1×2 matrix (=the transpose of $V_{10}$ matrix).

Referring back to FIG. 5, in step 502, the $c_c$ matrix can also be projected, thereby corresponding the parasitic coupling between net1 and net2 (see, use of $V_1^T$ in upper right quadrant and $V_1$ in lower left quadrant in estimated matrix below). Thus, after steps 501 and 502, the reduced matrix $\tilde{C}$ becomes:

$$\tilde{C} = \begin{bmatrix} V_1^T c_1 V_1 & V_1^T c_c \\ c_c V_1 & c_2 \end{bmatrix}$$

The projected $c_c$ matrix ($c_c*V_1$ term) forms a "forward capacitor pencil", which is subsequently treated as an input term when compressing net2. In a forward capacitor pencil, all forward capacitors have the same first terminal (i.e. are connected to the same low capacitance net).

In step 503, a reduced-order projection matrix $V_2$ for the $c_2$ portion of the matrix $\tilde{C}$ can be generated. In step 504, the forward capacitor pencil ($c_c*V_1$ term) can be projected using matrix $V_2$, to obtain the final set of forward capacitor pencils, which couple reduced net1 with reduced net2. The final form of the reduced capacitance matrix $C_r$ is:

$$C_r = \begin{bmatrix} V_1^T c_1 V_1 & V_1^T c_c V_2 \\ V_2^T c_c V_1 & V_2^T c_2 V_2 \end{bmatrix}$$

The two reduced nets are coupled solely through a collection of forward capacitor pencils, which allows the asynchronous partitioned solves to be performed. Also, it follows from the form of the reduced capacitance matrix $C_r$ above that the coupling between the two reduced nets is symmetric (i.e. signals from net1 provide inputs (through capacitive coupling) to net2, and vice versa).

Asymmetric asynchronous coupling between high and low capacitance nets in light of the above reduced capacitance matrix $C_r$ is now described. Suppose the capacitance for net1 is much smaller than the capacitance for net2, e.g. net1 is a low capacitance network and net2 is a high capacitance network. In such a case, the amount of capacitive coupling provided by net1 to net2 through forward capacitor pencils (term $V_2^T*c_c*V_1$ in the reduced capacitance matrix $C_r$) is insignificant and can be dropped incurring little accuracy penalty. (Note that the reverse is not true; however, coupling from net2 to net1 can be relatively significant for the low capacitance network net1.) Then, the reduced capacitance matrix $C_r$ can be simplified as follows:

$$C_r = \begin{bmatrix} V_1^T c_1 V_1 & V_1^T c_c V_2 \\ 0 & V_2^T c_2 V_2 \end{bmatrix}$$

Again, the two reduced nets can be solved asynchronously. However, at this point, while signals from the high-capacitance net (net2) still affect the behavior of net2 through forward capacitor pencils (term $V_1^T*c_c*V_2$ in the matrix above), the reverse is not true (i.e. actual signals from net2 do not affect signals from net1.—cf. the "0" matrix block). Hence, the asynchronous coupling between the two nets is asymmetric. In a typical industry design, this asymmetry can significantly reduce the number of input signals to a high-capacitance network, specifically those signals associated with relatively weak capacitive couplings from numerous low-capacitance networks. Consequently, simulation for typically very large high-capacitance networks becomes considerably faster. Note that the effect of capacitive couplings between low and high capacitance networks is not entirely neglected when simulating the behavior of high-capacitance networks. Specifically, this effect is approximately modeled by ground (lump) capacitors stamped on the high capacitance net (and included in the capacitance matrix $V_2^T*c_2*V2$ for the reduced network net2).

Technique 500 allows the compression and optimization of a parasitic network in the presence of asymmetric asynchronous couplings. Moreover, modified reduced order RC models can include asymmetric capacitor pencils, thereby allowing efficient circuit partitioning and asynchronous solves for different partitions (e.g. high-capacitance and low-capacitance nets).

Figure 6:
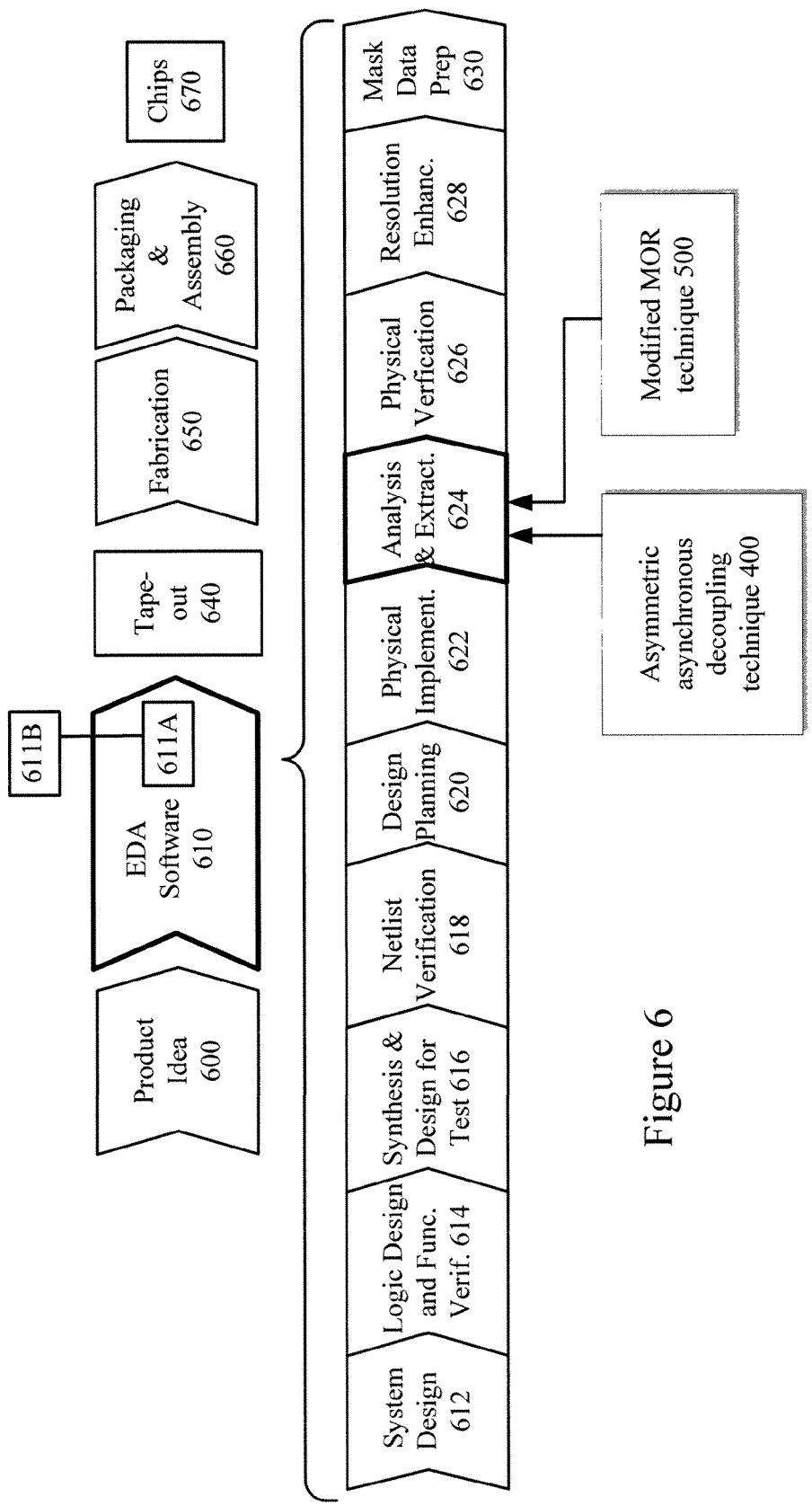
FIG. 6 illustrates shows a simplified representation of an exemplary digital ASIC design flow that can include an asymmetric asynchronous decoupling technique and a modified model order reduction technique.

FIG. 6 shows a simplified representation of an exemplary digital ASIC design flow that can include an asymmetric asynchronous decoupling technique and a modified model order reduction technique. At a high level, the process starts with the product idea (step 600) and is realized in an EDA software design process (step 610). When the design is finalized, it can be taped-out (event 640). After tape out, the fabrication process (step 650) and packaging and assembly processes (step 660) occur resulting, ultimately, in finished chips (result 670).

The EDA software design process (step 610) is actually composed of a number of steps 612-630, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components/steps of the EDA software design process (step 610) will now be provided. In one embodiment, one or more steps of the EDA software design process can be implemented using a computer-readable medium 611A, which is read by a computer 611B. Note that Astro, AstroRail, CustomSim, ESP, Hercules, IC Compiler, Magellan, Model Architect, Power Compiler, PrimeRail, Proteus, ProteusAF, PSMGen, Saber, StarRC, and System Studio are trademarks of Synopsys, Inc., and CATS, DesignWare, Design Compiler, Formality, HSIM, Leda, NanoSim, Primetime, Syndicated, TetraMAX, VCS, and Vera are registered trademarks of Synopsys, Inc.

System design (step 612): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products.

Logic design and functional verification (step 614): At this stage, the VHDL or Verilog code for modules in the system is written and the design is checked for functional accuracy. More specifically, the design is checked to ensure it generates expected outputs. Exemplary EDA software products from Synopsys, Inc. that can be used at this step include HSIM®, NanoSim®, CustomSim™, VCS®, VERA®, DesignWare®, Magellan™, Formality®, ESP™ and LEDA® products.

Synthesis and design for test (step 616): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler™, Tetramax®, and DesignWare® products.

Netlist verification (step 618): At this step, the netlist is checked for compliance with timing constraints and for correspondence with the VHDL/Verilog source code. Exemplary EDA software products from Synopsys, Inc. that can be used at this step include Formality®, PrimeTime™, and VCS® products.

Design planning (step 620): Here, an overall floorplan for the chip is constructed and analyzed for timing and top-level routing. Exemplary EDA software products from Synopsys, Inc. that can be used at this step include Astro™ and IC Compiler™ products.

Physical implementation (step 622): The placement (positioning of circuit elements) and routing (connection of the same) occurs at this step. Exemplary EDA software products from Synopsys, Inc. that can be used at this step include the Astro™ and IC Compiler™ products.

Analysis and extraction (step 624): At this step, the circuit function is verified at a transistor level, this in turn permits what-if refinement. Exemplary EDA software products from Synopsys, Inc. that can be used at this step include AstroRail™, PrimeRail™, Primetime®, and Star RC/XT™ products. In one embodiment, asymmetric asynchronous decoupling technique 400 and modified MOR technique 500 can be used in step 624.

Physical verification (step 626): At this step various checking functions are performed to ensure correctness for: manufacturing, electrical issues, lithographic issues, and circuitry. Exemplary EDA software products from Synopsys, Inc. that can be used at this step include the Hercules™ product.

Resolution enhancement (step 628): This step involves geometric manipulations of the layout to improve manufacturability of the design. Exemplary EDA software products from Synopsys, Inc. that can be used at this step include Proteus™, ProteusAF™, and PSMGen™ products.

Mask data preparation (step 630): This step provides the "tape-out" data for production of masks for lithographic use to produce finished chips. Exemplary EDA software products from Synopsys, Inc. that can be used at this step include the CATS® family of products.

The invention can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Techniques 400 and 500 allow decoupling of large post-layout nets from rest of the circuit with accuracy control in contrast to standard decoupling methods, which are either ineffective or do not provide adequate accuracy. Technique 400 can be used in conjunction with other decoupling methodologies, as shown by steps 411-413. Technique 400 can be combined with parasitic reduction methods, including MOR techniques without impairing the simulator's ability to perform partitioned, asynchronous solves using technique 500.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent to practitioners skilled in this art. Accordingly, it is intended that the scope of the invention be defined by the following claims and their equivalents.

The invention claimed is:

1. A method of providing asymmetric asynchronous decoupling of nets in a design for an integrated circuit, the method comprising:
   removing a coupling capacitor from an input list, the input list including coupling capacitors in the design, the coupling capacitor capacitively coupling two nets in the design, the two nets having capacitances C1 and C2, at least one of the capacitances C1 and C2 being higher than a first threshold, the coupling capacitor having a coupling capacitance Cc; and
   using a processor, determining when the coupling capacitance Cc is lower than a second threshold, and only one of the capacitances C1 and C2 is lower than the first threshold, then using a forward capacitance at whichever of the two nets has a lower capacitance and using a lump capacitance at the other net for simulation.

2. The method of claim 1, further including:
   when the coupling capacitance Cc is lower than the second threshold and both of the capacitances C1 and C2 are higher than the first threshold, then using lump capacitances at the two nets for the simulation.

3. The method of claim 1, further including:
   determining whether the capacitances C1 and C2 are within a predetermined range of each other;
   when the capacitances C1 and C2 are within the predetermined range of each other, then proceeding with using the forward capacitance; and
   when the capacitances C1 and C2 are not within a predetermined range of each other, then using lump capacitances at the two nets for the simulation.

4. The method of claim 1, further including when the capacitance Cc is greater than 10% of the capacitance C1 or the capacitance C2, whichever is smaller, then proceeding with using the forward capacitance.

5. The method of claim 1, further including creating the input list, the input list excluding any coupling capacitors forming a device that must retain its capacitive couplings to provide a desired functionality.

6. The method of claim 1, further including generating an output list, which includes transformed capacitors,
   wherein the transformed capacitors include forward capacitors and lump capacitors.

7. The method of claim 1, further including providing a modified model order reduction for the capacitances C1 and C2 and the coupling capacitance Cc.

8. The method of claim 7, further including generating an output list, which includes transformed capacitors and reduced order models for RC networks,
   wherein the transformed capacitors include forward capacitors and lump capacitors, and
   wherein the reduced order models are created from the transformed capacitors and resistors of the design.

9. A non-transitory, computer-readable medium storing computer-executable instructions for providing asymmetric asynchronous decoupling of nets in a design for an integrated circuit, the instructions when executed by a computer cause the computer to execute a process comprising:
   removing a coupling capacitor from an input list, the input list including coupling capacitors in the design, the coupling capacitor capacitively coupling two nets in the design, the two nets having capacitances C1 and C2, at least one of the capacitances C1 and C2 being higher than a first threshold, the coupling capacitor having a coupling capacitance Cc; and
   when the coupling capacitance Cc is lower than a second threshold, and only one of the capacitances C1 and C2 is lower than the first threshold, then using a forward capacitance at whichever of the two nets has a lower capacitance and using a lump capacitance at the other net for simulation.

10. The non-transitory, computer-readable medium of claim 9, further including:
    when the coupling capacitance Cc is lower than the second threshold and both of the capacitances C1 and C2 are higher than the first threshold, then using lump capacitances at the two nets for the simulation.

11. The non-transitory, computer-readable medium of claim 9, further including:
    determining whether the capacitances C1 and C2 are within a predetermined range of each other;
    when the capacitances C1 and C2 are within the predetermined range of each other, then proceeding with using the forward capacitance; and
    when the capacitances C1 and C2 are not within a predetermined range of each other, then using lump capacitances at the two nets for the simulation.

12. The non-transitory, computer-readable medium of claim 9, further including when the capacitance Cc is greater than 10% of the capacitance C1 or the capacitance C2, whichever is smaller, then proceeding with using the forward capacitance.

13. The non-transitory, computer-readable medium of claim 9, further including creating the input list, the input list excluding any coupling capacitors forming a device that must retain its capacitive couplings to provide a desired functionality.

14. The non-transitory, computer-readable medium of claim 9, further including generating an output list, which includes transformed capacitors,
    wherein the transformed capacitors include forward capacitors and lump capacitors.

15. The non-transitory, computer-readable medium of claim 9, further including providing a modified model order reduction for the capacitances C1 and C2 and the coupling capacitance Cc.

16. The non-transitory, computer-readable medium of claim 15, further including generating an output list, which includes transformed capacitors and reduced order models for RC networks,
   wherein the transformed capacitors include forward capacitors and lump capacitors, and
   wherein the reduced order models are created from the transformed capacitors and resistors of the design.

17. An electronic design automation (EDA) tool including a storage device that stores program instructions for providing asymmetric asynchronous decoupling of nets in a design for an integrated circuit, said program instructions performing a process comprising:
   removing a coupling capacitor from a list, the list including coupling capacitors in the design, the coupling capacitor capacitively coupling two nets in the design, the two nets having capacitances C1 and C2, at least one of the capacitances C1 and C2 being higher than a first threshold, the coupling capacitor having a coupling capacitance Cc; and
   when the coupling capacitance Cc is lower than a second threshold, and only one of the capacitances C1 and C2 is lower than the first threshold, then using a forward capacitance at whichever of the two nets has a lower capacitance and using a lump capacitance at the other net for simulation.

18. The EDA tool of claim 17, further including:
   when the coupling capacitance Cc is lower than the second threshold and both of the capacitances C1 and C2 are higher than the first threshold, then using lump capacitances at the two nets for the simulation.

19. The EDA tool of claim 17, further including:
   determining whether the capacitances C1 and C2 are within a predetermined range of each other;
   when the capacitances C1 and C2 are not within the predetermined range of each other, then proceeding with using the forward capacitance; and
   when the capacitances C1 and C2 are within a predetermined range of each other, then using lump capacitances at the two nets for the simulation.

20. The EDA tool of claim 17, further including when the capacitance Cc is greater than 10% of the capacitance C1 or the capacitance C2, whichever is smaller, then proceeding with using the forward capacitance.

21. The EDA tool of claim 17, further including creating the input list, the input list excluding any coupling capacitors forming a device that must retain its capacitive couplings to provide a desired functionality.

22. The EDA tool of claim 17, further including generating an output list, which includes transformed capacitors,
   wherein the transformed capacitors include forward capacitors and lump capacitors.

23. The EDA tool of claim 17, further including providing a modified model order reduction for the capacitances C1 and C2 and the coupling capacitance Cc.

24. The EDA tool of claim 23, further including generating an output list, which includes transformed capacitors and reduced order models for RC networks,
   wherein the transformed capacitors include forward capacitors and lump capacitors, and
   wherein the reduced order models are created from the transformed capacitors and resistors of the design.

* * * * *